United States Patent [19]
Ito et al.

[11] Patent Number: 5,581,709
[45] Date of Patent: Dec. 3, 1996

[54] MULTIPLE COMPUTER SYSTEM USING I/O PORT ADAPTOR TO SELECTIVELY ROUTE TRANSACTION PACKETS TO HOST OR SHARED I/O DEVICE

[75] Inventors: Takahiro Ito; Motoharu Taura, both of Kanagawa, Japan

[73] Assignee: Mitsubishi Denki Kabushiki Kaisha, Tokyo, Japan

[21] Appl. No.: 473,498

[22] Filed: Jun. 7, 1995

[30] Foreign Application Priority Data

Mar. 15, 1995 [JP] Japan .................................. 7-055652

[51] Int. Cl.⁶ ..................................................... G06F 13/14
[52] U.S. Cl. ................. 395/200.15; 395/200.03; 395/858
[58] Field of Search ............................. 395/325, 800, 395/375, 200.15, 200.03, 858

[56] References Cited

U.S. PATENT DOCUMENTS

| | | | |
|---|---|---|---|
| 4,207,609 | 6/1980 | Luiz et al. | 364/200 |
| 4,455,605 | 6/1984 | Cormier et al. | 364/200 |
| 4,574,350 | 3/1986 | Starr | 364/200 |
| 4,591,981 | 5/1986 | Kassabov | 364/200 |
| 4,768,150 | 8/1988 | Chang et al. | 364/300 |
| 4,780,821 | 10/1988 | Crossley | 364/200 |
| 4,918,588 | 4/1990 | Barrett et al. | 364/200 |
| 5,019,966 | 5/1991 | Saito et al. | 364/200 |
| 5,287,537 | 2/1994 | Newmark et al. | 395/800 |
| 5,297,262 | 3/1994 | Cox et al. | 395/325 |
| 5,325,493 | 6/1994 | Herrell et al. | 395/375 |

OTHER PUBLICATIONS

Serialization of ISA bus for Transmission up to 100m through an Optical Fiber; Nikkei Electronics, Aug. 22, 1994 No. 615 pp. 199–129.

*Primary Examiner*—Thomas C. Lee
*Assistant Examiner*—Duo Chen
*Attorney, Agent, or Firm*—Wolf, Greenfield & Sacks, P.C.

[57] ABSTRACT

In a computer system of the present invention, CPUs of a single or a plurality of host computers access the shared IO devices connected to a shared IO bus of each shared IO device in the same manner as the host IO device in each host computer connected to the host IO bus. Each of the CPUs selects one of the host IO devices and shared IO devices by IO addressing to issue a transaction; each of the IO host adaptors gives the transaction a host number when the transaction is issued to each of the shared IO devices; and an IO port adaptor analyzes the host number of the transaction issued for each of the IO devices to decide to return said transaction to which of the plurality of host computers.

14 Claims, 12 Drawing Sheets

FIG. 2

| IO CARD ADDRESS |
|---|
| 300 |
| 400 |
|  |
|  |

| HOST NUMBER |
|---|
| TRANSACTION INFORMATION |
| EOF |

| STATUS | BUSY RESPONSE FLAG | | PRECEDENT FLAG | | OPERATION |
|---|---|---|---|---|---|
| ST1 | 0 | 0 | 0 | 0 | INITIAL STATE |
| ST2 | 0 | 1 | 0 | 1 | HOST 1B WAIT |
| ST3 | 0 | 1 | 0 | 1 | HOST 1A TRANSACTION COMPLETION |
| ST4 | 1 | 1 | 0 | 1 | HOST 1A REQUEST |
| ST5 | 1 | 0 | 1 | 0 | HOST 1B TRANSACTION EXECUTION |
| ST6 | 0 | 0 | 0 | 0 | HOST 1A TRANSACTION EXECUTION |

FIG. 9

| SWITCH PORT NUMBER | SHARED IO APPARATUS NUMBER | IO ADDRESS OF IO APPARATUS |
|---|---|---|
| 2 | 1 | 300 |
| | | 400 |
| 3 | 2 | 500 |
| | | 600 |
| 4 | 3 | 700 |
| | | 800 |

FIG. 10

| |
|---|
| SWITCH PORT NUMBER |
| HOST PORT NUMBER |
| TRANSACTION INFORMATION |
| EOF |

FIG. 15A
| SWITCH PORT NUMBER | SHARED IO APPARATUS NUMBER | IO ADDRESS OF 1ST HOST | IO ADDRESS OF IO CARD |
|---|---|---|---|
| 2 | 1 | 200 | 100 |
| 2 | 1 | 300 | 200 |
| 3 | 2 | 400 | 100 |
| 3 | 2 | 600 | 200 |
| 4 | 3 | 700 | 100 |
| 4 | 3 | 800 | 200 |
FIG. 15B
| SWITCH PORT NUMBER | SHARED IO APPARATUS NUMBER | IO ADDRESS OF 2ND HOST | IO ADDRESS OF IO CARD |
|---|---|---|---|
| 2 | 1 | 100 | 100 |
| 2 | 1 | 200 | 200 |
| 3 | 2 | 300 | 100 |
| 3 | 2 | 400 | 200 |
| 4 | 3 | 500 | 100 |
| 4 | 3 | 600 | 200 |
FIG. 16A
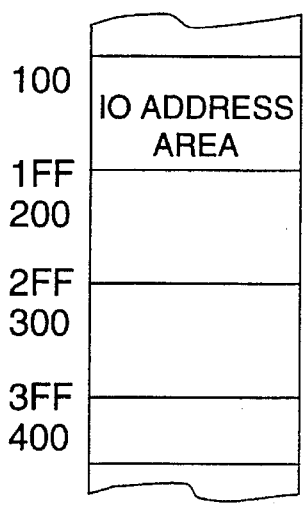
FIG. 16B
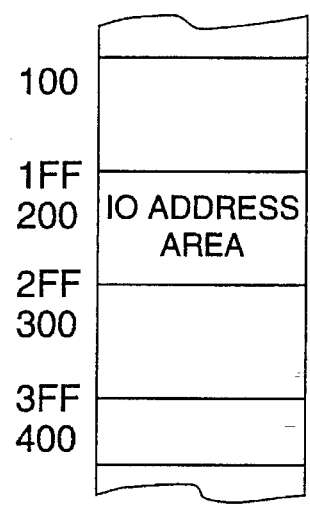
FIG. 16C
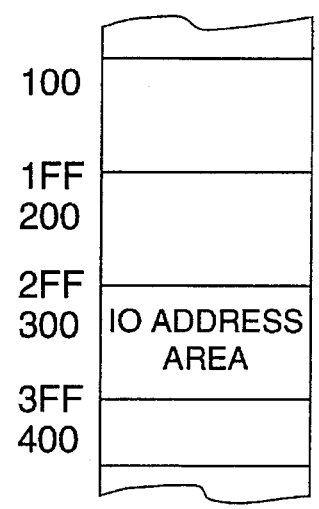

MULTIPLE COMPUTER SYSTEM USING I/O PORT ADAPTOR TO SELECTIVELY ROUTE TRANSACTION PACKETS TO HOST OR SHARED I/O DEVICE

BACKGROUND OF THE INVENTION

1. Field of the Invention

The present invention relates to a multi-computer system in which a single or plural independent host computers share a single or plural shared IO devices and each of the host computers issues a transaction optionally.

2. Description of the Related Art

Conventionally, if it is desired that the IO (input output) bus in a host computer (hereinafter referred to as "host") is extended so as to be connected to a larger number of IO devices, or connected to an extended IO apparatus physically apart from it, a bus bridge has been generally used ("Serialization of ISA bus for transmission up to 100 m through an optical fiber": Nikkei Electronics 1994.8.22 (no. 615) p119 –p129). The bus bridge mechanism has a configuration as shown in FIG. 17. In FIG. 17, reference numeral 1 denotes a host, 2: an extended IO apparatus including an IO device such as an IO card, 3: an IO bus within the host 1, 40: an IO card connected to the IO bus 3, and 5: an IO host adaptor connected to the IO bus 3. The IO host adaptor 5 includes an IO bus interface 51, a transaction packet processing unit 53 and a transmission path interface 54 located in order from the side of the IO bus 3.

Numeral 6 denotes an IO extension cable which connects the host 1 and the extended IO apparatus 2, and 7: an IO port adaptor connected to the IO bus 8 within the extended IO apparatus. The IO port adaptor 7 also includes an IO bus interface 74, a transaction packet processing unit 73 and a host transmission path interface 71 located in order from the side of the IO bus 8. Numerals 42 and 43 denote IO cards connected to IO bus 8, respectively, and reference numeral 10 denotes a CPU (central processing unit) located within the host 1. The transmission path interface 54 of the host 1 is connected to the host transmission path interface 71 of the extended IO apparatus 2 through the IO extension cable 6.

When a transaction for the IO cards 42 and 43 on the side of the extended IO apparatus 2 generates on the IO bus 3 of the host 1, the IO host adaptor 5 selectively captures this transaction. Then, the transaction is packetted in accordance with the packet format which is previously defined according to the kind, and transmitted to the IO port adaptor 7 on the side of the extended IO apparatus 2 via the IO extension cable 6. The IO port adaptor 7 decodes the packet information so that the transaction issued on the IO bus 3 of the original host 1 is issued on the IO bus 8 within the extended IO apparatus 2.

Thus, the CPU 10 of the host 1 only issues the transaction while designating the values "100", "300" and "400" of the IO card addresses applied to the IO cards 40, 42 and 43, respectively so as to access these IO cards freely without being conscious about distinction among the IO card 40 connected to the internal IO bus 2 and the IO cards 42 and 43 connected to the IO bus 8 of the extended apparatus 2.

Meanwhile, connecting all parallel bus signals, as they are, to the extended IO apparatus 2 increases the number of signal lines of the IO extension cable 6, and cannot lengthen the signal line. For this reason, the above bus bridge mechanism serializes the packetted bus signal before supplying it onto the transmission path of the IO extension cable 6. In this way, the transaction on the IO bus 3 can be created again on the IO bus 8 of the extended IO apparatus 2. Therefore, the IO cards 42 and 43 on the IO bus 8 can be operated completely compatibly with the IO card 40 connected to the IO bus 3 of the host 1.

The bus bridge mechanism, however, can basically support only the one-to-one connection between a single host 1 and a single extended IO apparatus 2. For example, in order to connect two hosts to a single extended IO apparatus serving as a shared IO device, the above bus bridge mechanism can be used in an arrangement as shown in FIG. 18 in which the same reference numerals designate the corresponding elements in FIG. 17. In FIG. 18, reference numeral 11 denotes an inter-host communication network for communication between hosts 1A and 1B.

In such an arrangement, when two hosts 1A and 1B are to access the shared extended IO apparatus 2, competition control between the hosts 1A and 1B has to be performed. However, the IO port adaptors 7A and 7B respectively do not have the function of competition control, because they merely correspond to a signal host connection. Therefore, the competition control between the hosts 1A and 1B has to be performed by a separate route using the inter-host communication network 11 before the hosts 1A and 1B issue transactions for the IO buses 3A and 3B, respectively. Otherwise, bus arbitration between the IO port adaptors 7A and 7B have to be performed.

Further, if the plural hosts 1A and 1B share the extended IO apparatus 2, each of the hosts 1A and 1B have to map, in its own IO space, the IO devices 42 and 43 in the extended IO apparatus 2. The above described conventional system, however, cannot deal with the case where the hosts have different items of mapping information. As a result, when the hosts 1A and 1B share the shared IO device, a limitation occurs that they must have the same mapping information.

Where it is desired that a single host 1 is connected to two or more extended IO apparatuses 2A and 2B, an arrangement can be adopted as shown in FIG. 19 in which the same reference numerals designate the corresponding elements in FIGS. 17 and 18. As seen from the drawing, in order to connect the host 1 to two extended IO apparatuses 2A and 2B, two IO host adaptors 5A and 5B have to be located on the IO bus 3 of the host 1. The maximum number of connections is limited by the number of slots of the IO bus 3 of the host 1. Aside from the above system, such a configuration as a single extended apparatus connected to another extended apparatus through IO port adaptors 7 may be proposed. However, an increase in the number of the extended IO apparatuses leads to an increase in transaction delay, thereby deteriorating the performance of the system.

SUMMARY OF THE INVENTION

It is an object of the present invention to provide a multi-computer system which permits a CPU of each of a single or plural hosts to access an IO device connected to an IO bus in a single or plural shared IO devices as if it were an IO device connected to the IO bus in the host; can perform competition control for plural hosts independently of each other even when they access the same shared IO device; can deal with the case where the plural hosts have different IO device mappings for the IO cards in the shared IO device; and can freely change connection positions of the hosts to the shared IO device and the number thereof.

A multi-computer system according to the present invention is comprised of: a shared IO device having a shared IO bus, an IO port adaptor connected to the shared IO bus, and shared IO devices connected to the shared IO bus; and a plurality of host computers, each including a host IO bus, an IO host adaptor connected to the host IO bus and the IO port adaptor, a host IO device connected to the host IO bus, and a CPU connected to the host IO bus, for selecting the host IO devices and an shared IO device by IO addressing to issue a transaction to the IO devices; wherein the IO host adaptor transmits the transaction with a host number when the transaction is issued to the shared IO device; the IO port adaptor analyzes the host number of the transaction issued to the shared IO device, and decides to return the transaction to which of the plurality of host computers.

In the present invention, CPUs in a plurality of host computers select one of host IO devices connected to the host IO buses and a shared IO device connected to the shared IO bus by IO addressing to issue a transaction; the IO host adaptor in each of the host computers transmits the transaction with a host number when the transaction is issued to said IO device connected to the shared IO bus; and the IO port adaptor in the shared IO device analyzes the host number of the transaction issued to the IO device connected to the shared IO bus to decide to return the transaction to which of the plurality of host computers. In this way, the CPUs in the plural host computers can access the IO devices connected to the shared IO bus in the same manner as the IO devices connected to the internal host IO bus.

BRIEF DESCRIPTION OF THE DRAWINGS

In the accompanying drawings;

FIG. 2 is a view illustrating the IO table in the IO host adaptor in FIG. 1;

FIG. 3 is a view illustrating the transaction packet format used in the computer system of FIG. 1.

FIG. 9 is a view showing the IO mapping table in the IO host adaptor in FIG. 8;

FIG. 10 is a view showing the transaction packet used in the computer system in FIG. 8;

FIGS. 15A and 15B are views showing the IO mapping table in the IO host adaptor in FIG. 11;

FIGS. 16A, 16B and 16C are schematic views for explaining the IO memory map in the host CPU in FIG. 11;

PREFERRED EMBODIMENTS OF THE INVENTION

The preferred embodiments of the present invention will be described as follows referring to the accompanying drawings.

Embodiment 1

Figure 1:
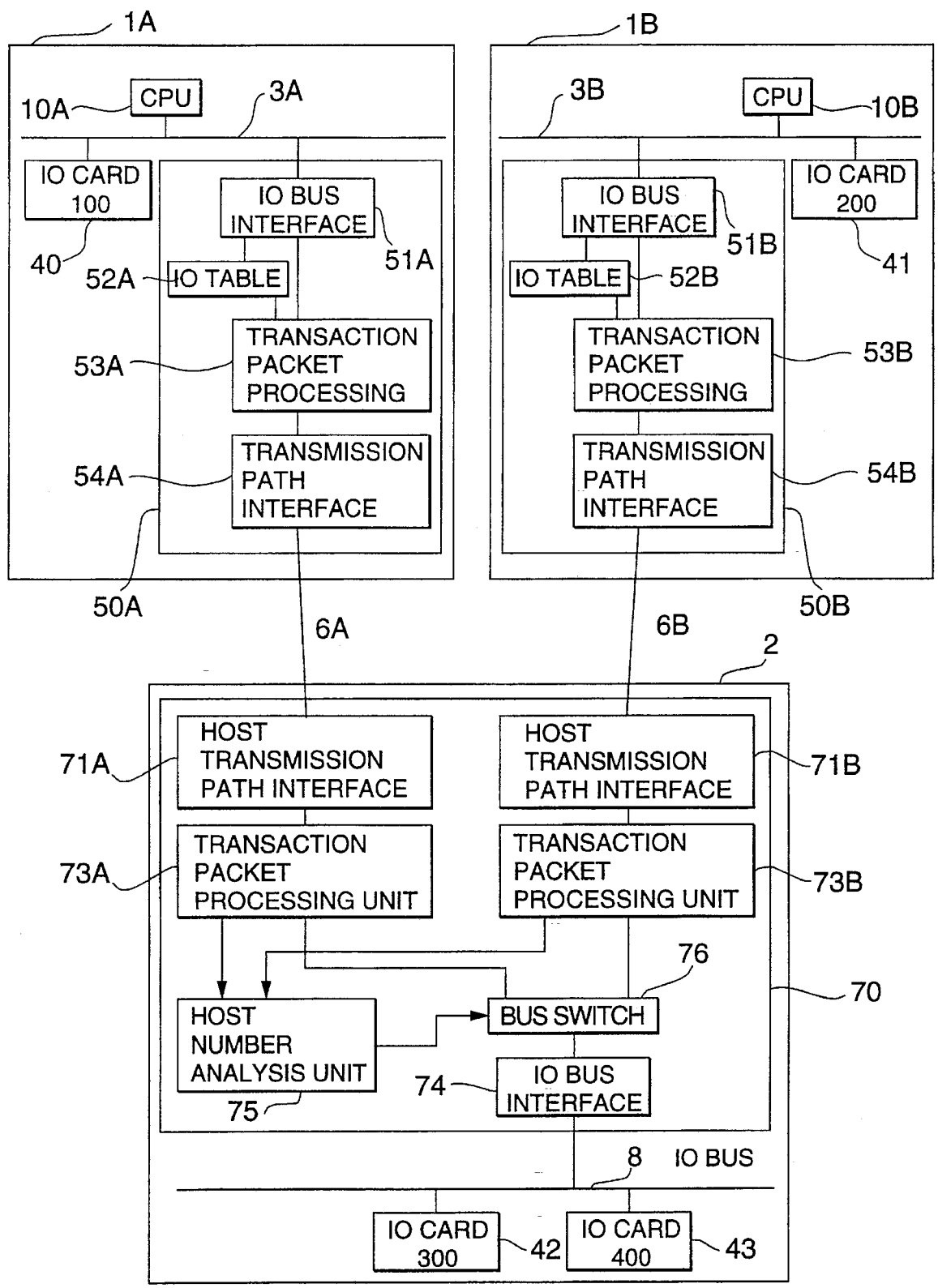
FIG. 1 is a block diagram showing a first embodiment of a computer system according to the present invention.
Figure 17:
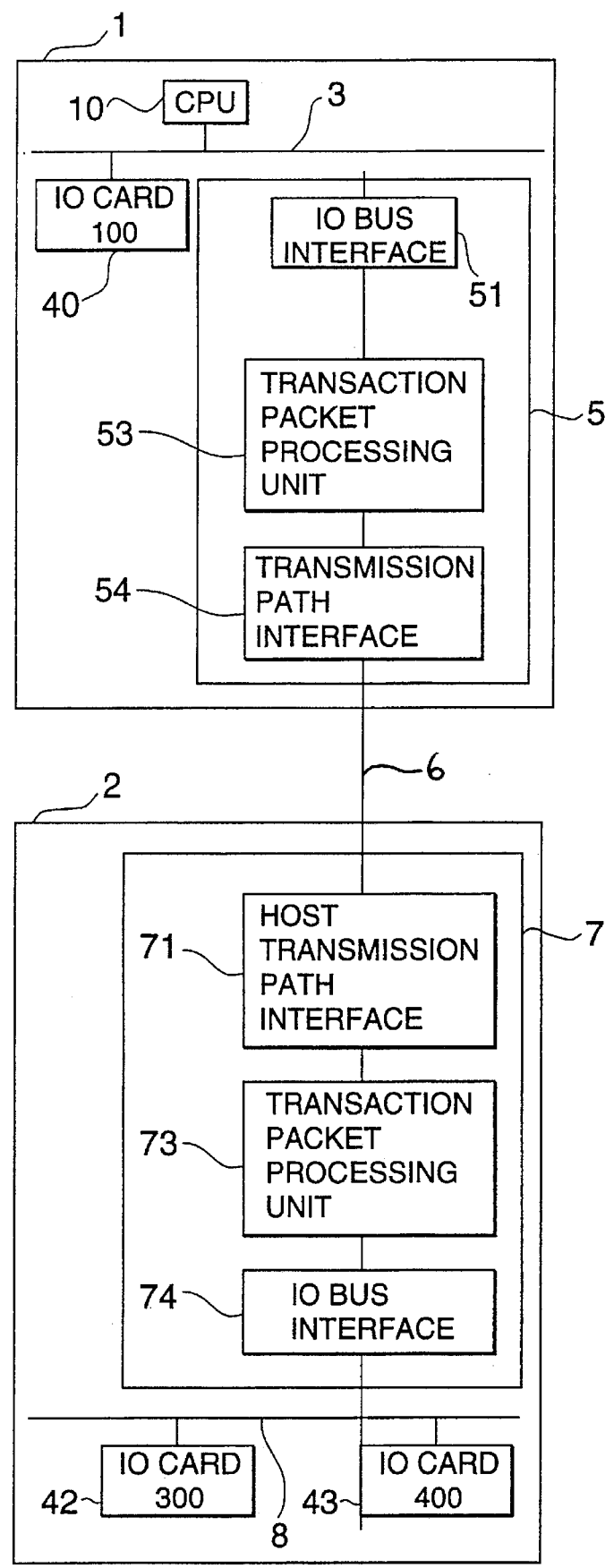
FIG. 17 is a block diagram showing the configuration of the conventional computer system.
Figure 18:
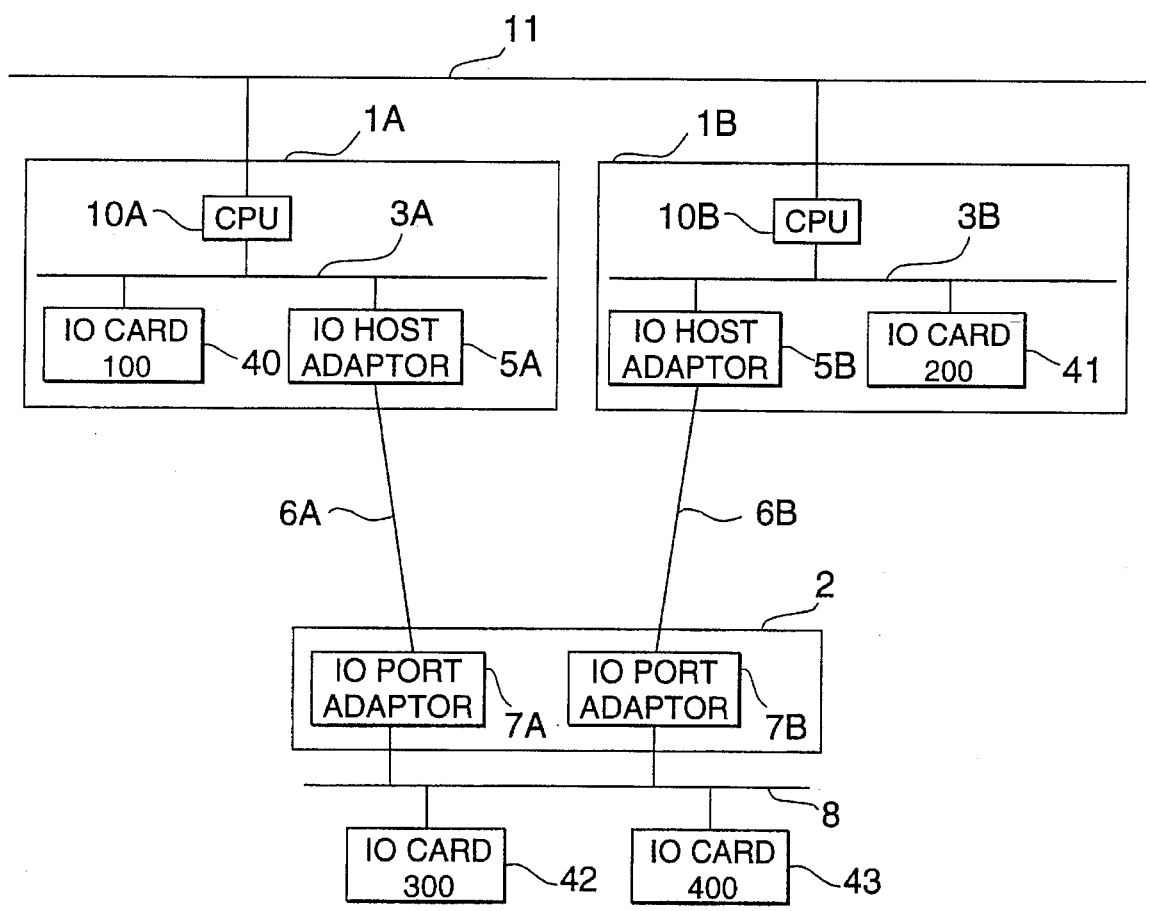
FIG. 18 is a block diagram of the configuration in which a plurality of hosts are connected in the conventional computer system.
Figure 19:
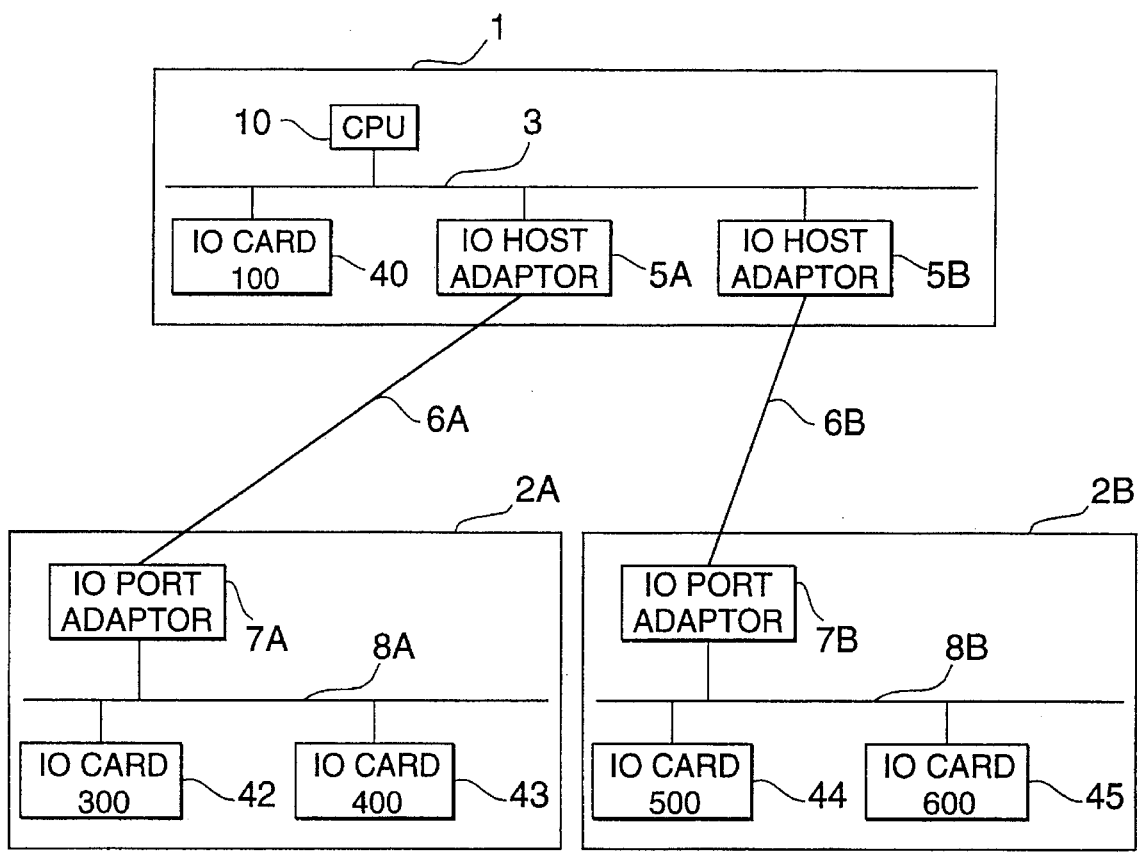
FIG. 19 is a block diagram of the configuration in which a plurality of extended IO apparatuses are connected in the conventional computer system.

A first embodiment of the present invention is wholly shown in FIG. 1 in which the same reference numerals refer to the same elements in FIG. 17. A first host 1A and a second host 1B are connected to one shared IO device 2. In this embodiment, the corresponding IO host adaptors 50A and 50B of the first host 1A and second host 1B, respectively, include IO bus interfaces 51A and 51B, transaction packet processing units 53A and 53B, and transmission interfaces 54A and 54B which are located in order from the side of IO buses 3A and 3B, respectively. In addition, IO tables 52A and 52B are connected to the IO bus interfaces 51A and 51B of the IO host adaptors 50A and 50B, respectively, the IO tables 52A and 52B storing IO card addresses of IO cards 42 and 43 located on the side of the shared IO device 2.

An IO port adaptor 70 of the shared IO device 2 includes a host number analysis unit 75 and a bus switch 76. The host number analysis unit 75 controls the bus switch 76. Actually, the IO bus 8 of the shared IO device 2 is switched by the host number analysis unit 75 through the IO bus switch 76 so as to be connected to the IO host adaptor 50A or 50B of the first or second host 1A or 1B through the first or second transaction packet processing unit 73A or 73B and the first or second host transmission path interface 71A or 71B.

Data stored on the IO tables 52A and 52B are shown in FIG. 2. The IO table 52A (52B) stores "300" and "400" as addresses of the IO cards 42 and 43 connected to the IO bus 8 in the shared IO device 2. The format of the transaction packet generated by the transaction packet processing unit 53A (53B) of the IO host adaptor 50A (50B) is shown in FIG. 3. The transaction packet includes a host number, transaction information issued from CPU 10A (10B) and an end-of-frame (EOF) representing the end of the transaction information.

In such a configuration, for example, if the CPU 10A of the first host 1A issues a transaction for an access request for the IO card 42 on the shared IO device 2, the value "300" of the IO card address of the IO card 42 is outputted to the IO bus 3A of the first host 1A. The IO bus interface 51A of the first IO host adaptor 50A compares this IO card address of the IO card address 42 with the IO card addresses registered on the IO table 52A.

As described above in connection with FIG. 2, since the value "300" of the IO card address is registered on the IO table 52A, the IO host adaptor 50A receives this transaction so that the transaction packet processing unit 53A generates a transaction packet to be transmitted to the IO port adaptor 70 of the shared IO device 2. Simultaneously, a wait (WAIT) signal of the IO bus 3A is turned on thereby setting the IO bus 3A for a wait state.

Figure 4:
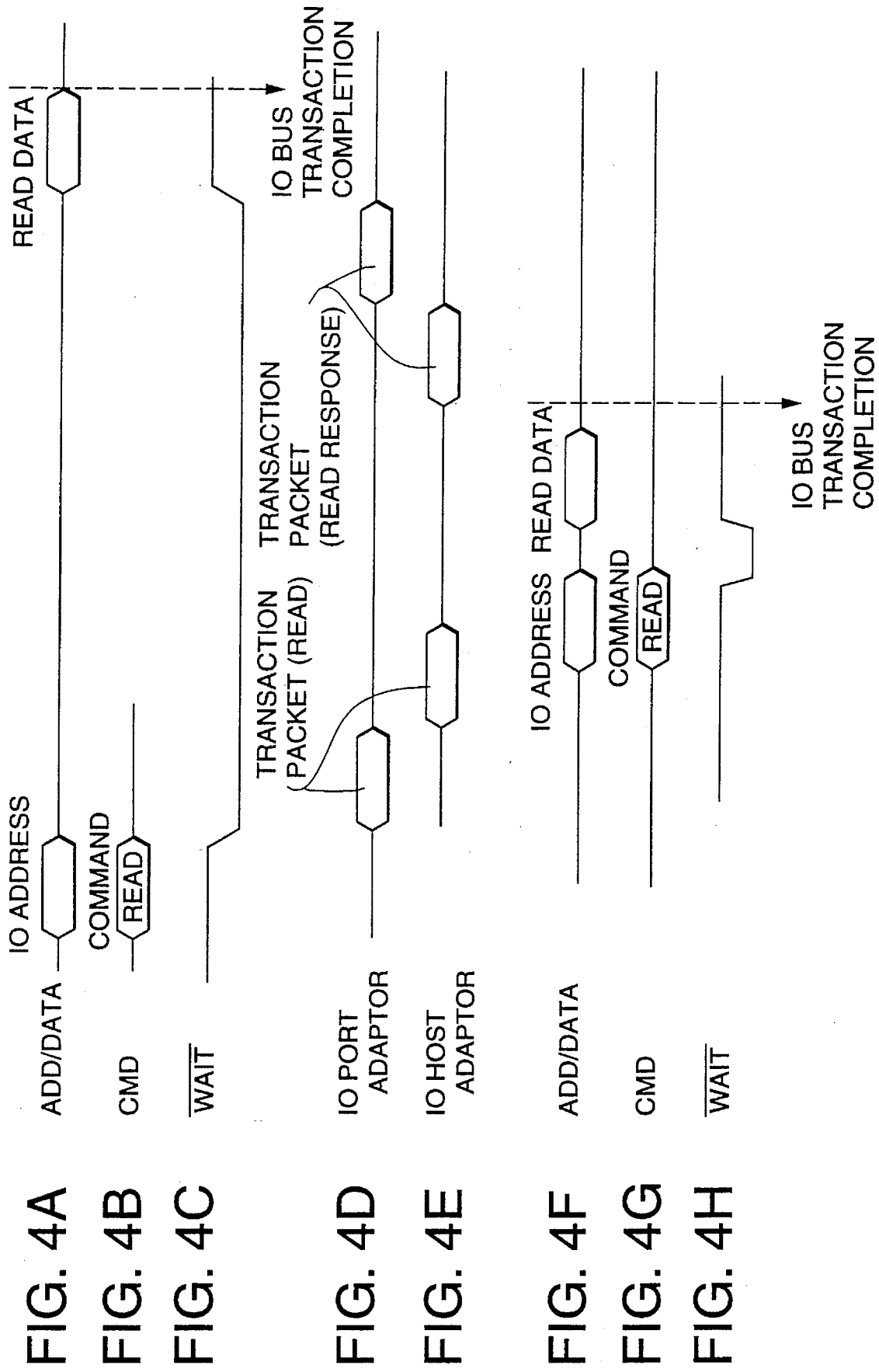
FIGS. 4A to 4H show a timing chart for explaining the operation of the CPU in the host in FIG. 1 accessing the IO card in the shared IO device.

The flow of the read transaction processing in this embodiment is shown in FIGS. 4A to 4H. In a bus which uses a command signal CMD shown in FIG. 4B in addition to the address signal ADD/DATA shown in FIG. 4A as the IO bus 3, when a decision of a read transaction is made in terms of the command signal CMD shown on the IO bus 3, the transaction packet as shown in FIG. 3 is generated in accordance with the read transaction format previously defined in connection with the side of the IO port adaptor 70. The transaction packet is transmitted to the IO port adaptor 70 through the IO host adaptor 50A (50B) in the sequence as shown in FIGS. 4D and 4E.

The IO port adaptor 70 analyzes the host number at the head of the transaction packet to switch the bus switch 76 to the side of the first host 1A in accordance with the host number. Thereafter, the IO port adaptor 70 issues a bus transaction as shown in FIGS. 4F, 4G and 4H for the IO bus 8 via the IO bus interface 74. The transaction on the IO bus 8 is entirely the same as that issued by the CPU 10A in the first host 1A for the IO bus 3A. The IO port adaptor 70, when a read data is returned as a response to the transaction, generates a transaction packet by read response.

As described above, the bus switch 76 holds the state switched to the side of the first host 1A, and the transaction packet by the read response is generated by the first transaction packet processing unit 73A and transmitted to the first host 1A. As shown in FIGS. 4D to 4F, when the transaction packet sent by the read response reaches the IO host adaptor 50A, the transaction packet processing unit 53A takes out the read data which is outputted as an ADD/DATA signal of the IO bus 3. Upon completion of the data output, the wait signal WAIT is turned off so as to release the wait state of the IO bus 3.

Figure 5:
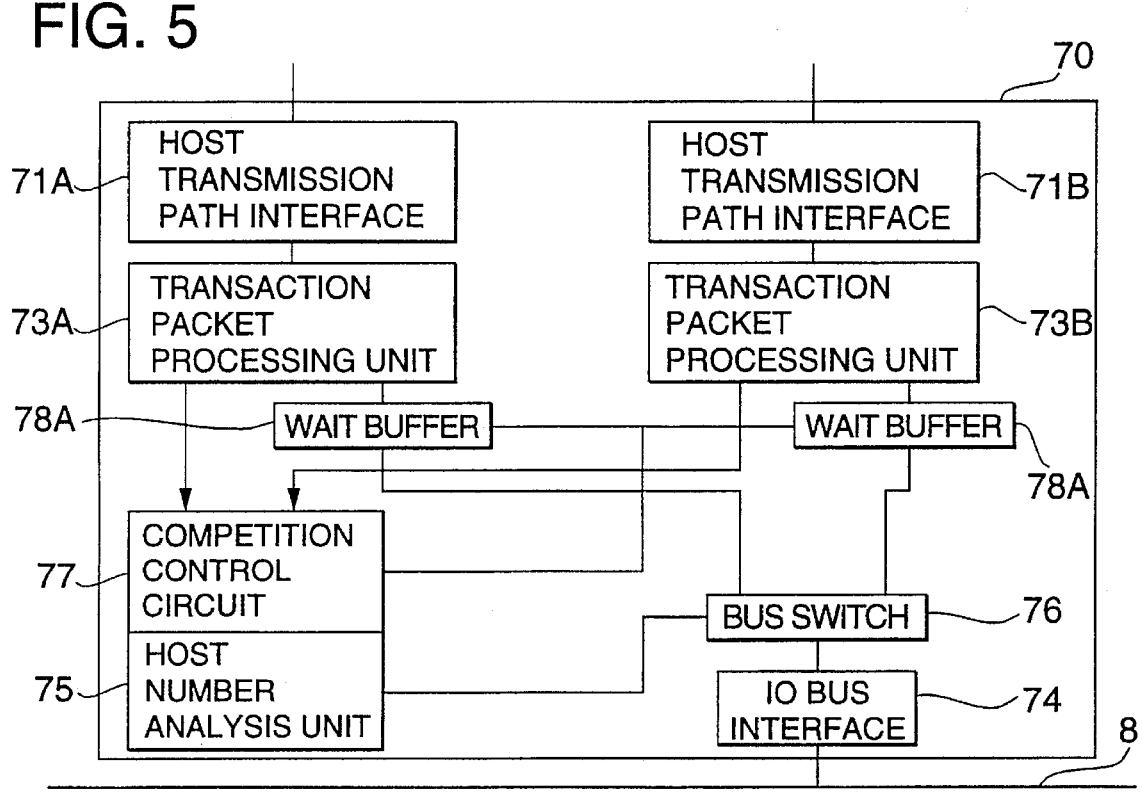
FIG. 5 is a block diagram showing the configuration of the IO port adaptor provided with a competition control circuit in the computer system in FIG. 1.

Next, an explanation will be given of the competition control in which the first host 1A and the second host 1B simultaneously access the shared IO device 2. The IO port adaptor 70 performing competition control is shown in FIG. 5 in which the same reference numerals refer to the same elements in FIG. 1. The IO port adaptor 70 includes, in addition to the configuration shown in FIG. 1, a competition control circuit 77 and waiting buffers 78A and 78B corresponding to the first host 1A and second host 1B, respectively. When transaction packets reach simultaneously from the first host 1A and second host 1B, or another transaction reaches while either transaction is being processed, the competition control circuit 77 receives only one transaction of them and transmits the transaction thus received to the host number analysis unit 75. Thus, the bus switch 76 is fixed to either one of the hosts 1A and 1B.

The transaction not selected is stored in the waiting buffer 78A or 78B. Upon completion of the transaction selected previously, the bus switch 76 is switched to change a connection so that the contents of the waiting buffer 78B or 78A is issued as a new transaction to the IO bus 8. Incidentally, in this case, the contents of the waiting buffers 78A and 78B are defined by the maximum amount of data generated by the transaction on the IO bus 8.

Figure 6:
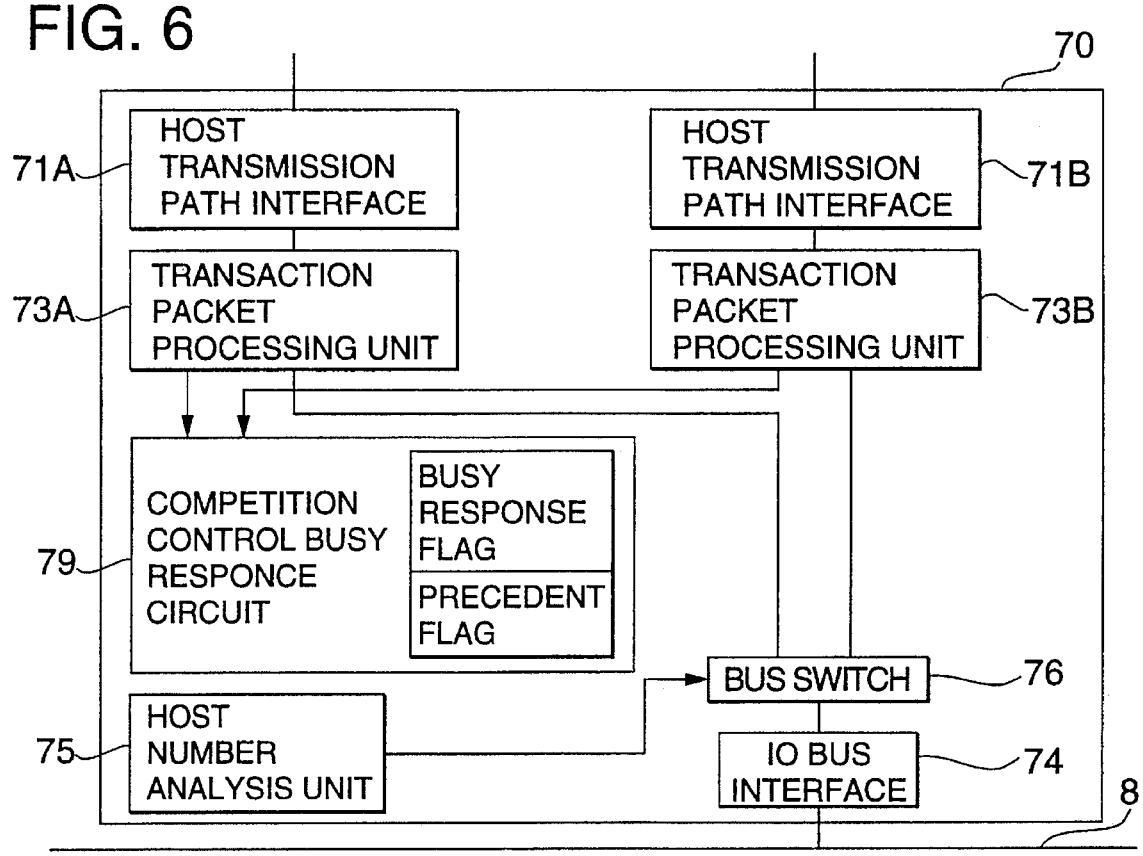
FIG. 6 is a block diagram showing the configuration of the IO port adaptor provided with a busy response circuit in a computer system in FIG. 1.

Another method of competition control is shown in FIG. 6 in which the same reference numerals refer to the same elements in FIG. 5. This method is effective to support the bus transaction abort processing as an IO bus signal. When transaction packets reach simultaneously from the first host 1A and second host 1B, or another transaction reaches while either transaction is being processed, a competition control and busy response circuit 79 receives only one transaction and transmits the transaction to the host number analysis unit 75. Thus, the bus switch 76 is fixed to either one of the hosts 1A and 1B.

For the side of the host 1B or 1A, a busy response packet is generated and transmitted to the pertinent IO host adaptor 50B or 50A. In the competition control and busy response circuit 79, the busy flag and precedent flag on the pertinent host 1B or 1A are set (ST1, ST2 in FIG. 7). When the busy flag is set, a busy response results for the host 1A performing the transaction at present until when the transaction from the host 1B is received upon completion of the transaction now being received. This is because it can be decided that the second host 1B has a priority from the fact that the precedent flag is directed to the second host although the busy flag is set for the first host 1A indicated by ST3 and ST4 in FIG. 7.

The transaction packet processing unit 53B or 53A on the side of the IO host adaptor 50B or 50A issues a transaction abort signal for the IO bus 3A or 3B by the busy response packet. When the transaction abort signal is responded, the CPU 10B or 10A issues the same transaction again. If the transaction on one side has been already completed when the transaction issued again reaches the IO port adaptor 70, the precedent flag is referred to receive the transaction. Due to being received this transaction the busy flag in the second host 1B is reset as indicated by ST5 in FIG. 7 and the precedent flag is also set for the side of the first host 1A.

According to such a configuration, in a case where the two hosts 1A and 1B are connected with the shared IO apparatus 2 through the IO host adaptors 50A and 50B and the IO host adaptor 70, when transactions are issued for the IO cards 42, 43 on the IO bus 8 of the shared IO apparatus 2, the IO host adaptors 50A and 50B transmit them with host numbers. In the IO port adaptor 70, the host number analysis unit 75 stores the host numbers of the transactions for the IO cards 42 and 43, and the bus switch 76 is selected to determine to which of the hosts 1A and 1B the response should be returned. Thus, the two hosts 1A and 1B can access the IO cards 42 and 43 connected to the IO bus 8 in the one shared IO device 2 in the same manner as the IO cards 40 and 41 connected to the IO buses 3A and 3B within the hosts 1A and 1B.

In such a configuration, the IO port adaptor 70 is provided with the waiting buffers 78A and 78B so that the transaction in the one host 1A is selectively processed while the transaction in the other host 1B is stored in the waiting buffer 78B, or otherwise the transaction in the one host 1A is selectively processed and bus busy control is made for the transaction of the other host 1B and also the flag-control by the busy response flag and precedent flag permits competition control for the hosts 1A and 1B to be made independently from each other even when the two hosts 1A and 1B access the shared IO device 2.

In the first embodiment described above, two hosts 1A and 1B are connected to the one shared IO device 2, but three or more hosts may be connected to the one shared IO device 2. In this case, the bus switch 76 which can deal with plural hosts is selected and the host number analysis unit 75 controls the bus switch 76 in accordance with the host number. Either of the methods of FIGS. 5 and 6 can be used for competition control.

Embodiment 2

Figures 7, 8:
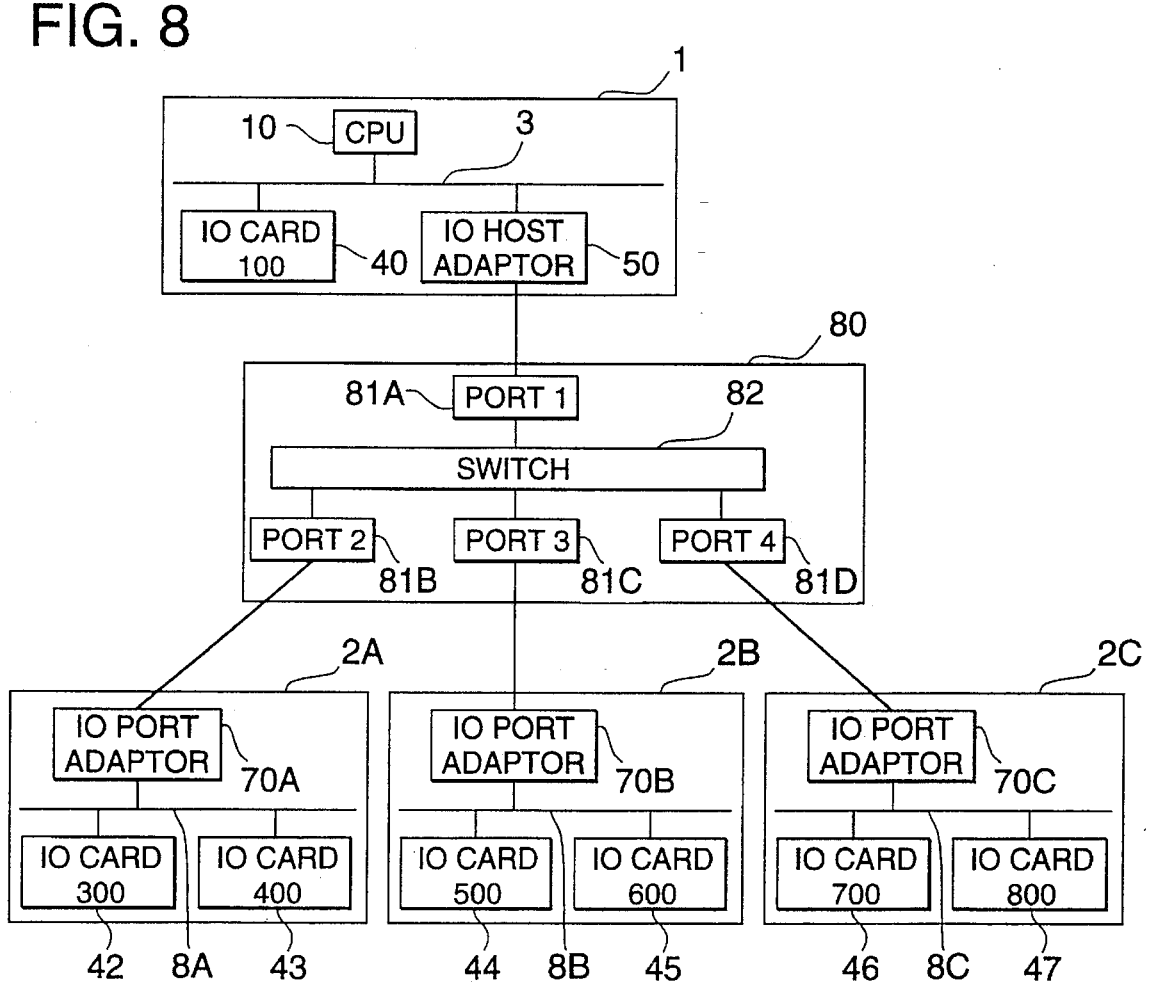
FIG. 7 is a view for explaining the transient operation of the busy response flag and advanced flag in the busy response circuit in FIG. 6.
FIG. 8 is a block diagram showing the configuration of a second embodiment of the computer system according to the present invention.

The second embodiment of the multi-computer system according to the present invention is shown in FIG. 8 in which the same reference numerals refer to the same elements in FIG. 1. As seen from FIG. 8, a single host 1 is connected to three shared IO devices 2A, 2B and 2C through a switch device 80. In this embodiment, the switch device 80 includes switch ports 81A, 81B, 81C and 81D and a switch body 82. The switch ports 81A, 81B, 81C and 81D are connected to the IO host adaptor 50 of the host 1, IO adaptors 70A, 70B and 70C of the shared IO devices 2A, 2B and 2C, respectively. Here, the inner structure of the IO host adaptor and the IO port adaptors are similar to those shown in FIG. 1.

The switch body 82 is constructed by a so-called "crossover switch" in which another switch port 81 is selected from one switch port for data transfer. Actually, the switch body 82 outputs the transmission transaction packets inputted from the IO host adaptor 50, the IO port adaptors 70A, 70B and 70C in accordance with the output port information stored in the packets.

In this embodiment, as shown in FIG. 9, the IO table 52 held by the host IO adaptor 50, in addition to the configuration of the first embodiment described above, holds those of the shared IO devices 2A to 2C connected to these switch ports correlated with the numbers of the switch ports 81A to 81D and also holds the IO card addresses of the IO cards 42, 43; 44, 45; and 46, 47 connected to the IO buses 8A to 8C of the respective shared apparatuses correlated therewith.

Actually, the information representative of the following connections is held. To the IO bus 8A of the number "1" connected to the switch port 81B of the number "2", the IO cards 42 and 43 having values "300" and "400" as the IO card addresses are connected; to the IO bus 8B of the shared IO device 2B of the number "2" connected to the switch port 81C, of the number "3" the IO cards 44 and 45 having values of "500" and "600" as IO addresses are connected; and to the IO bus 8C of the shared IO device 2C of the number "3" connected to the switch port 81D of the number "4", IO cards 46 and 47 having values "700" and "800" as the IO card addresses are connected.

In such a configuration, when the CPU 10 of the host 1 issues a transaction for the IO card address stored in the IO table 52 within the IO host adaptor 50 to the IO bus 3, the IO host adaptor 50 receives the transaction and inserts the transaction information in a packet as described in the first embodiment. Then, referring to the table 52 in FIG. 9, the switch port number connected to the shared IO device 2 having the corresponding IO address is selected and stored as header information for the packet as shown in FIG. 10. The switch port number connected to the host 1 itself as a response destination information of a response packet from the shared IO device 2 is also stored.

For example, in the case of the transaction packet for the IO card 42 having an IO card address of "300", the values "2" and "1" are stored as a switch port number and a host port number in header information, respectively. The switch device 80 determines an output destination port using the header information of the transaction packet having reached the first switch port 81A. When the IO card address is a value of "300", the second switch port 81B is selected, and the corresponding transaction packet is transferred to the first shared IO device 2A via the second switch port 81B.

In the case of this embodiment, the IO port adaptor 70A of the shared IO device 2A has the same configuration as in the first embodiment in FIG. 1, and one pair of two pairs of host transmission path interfaces 71A and 71B and transaction packet processing units 73A and 73B is not used. Namely, the competition control mechanism as described in the first embodiment is not used and the bus switch 76 is fixed to either one, e.g., the first host 1A. After the IO port adaptor 70A receives the transaction packet, the host number analysis unit 75 stores the host port number of the response destination from the packet header information.

The procedure of issuing a transaction to the IO bus 8A is the same as in the first embodiment. The transaction packet format as shown in FIG. 10A is used to generate the transaction response packet. Namely, the host port number stored in the host number analysis unit 75 is used as the header information of the response transaction packet. In this embodiment, it is "1" as in the transaction packet described above. Subsequently, the response packet created is transmitted to the IO host adaptor 50 in the same manner as the procedure of transmitting a transaction packet from the host 1.

In such a configuration, the IO host adaptor 50 of the host 1 and the IO port adaptors 70A to 70C of the plural shared IO devices 2A to 2C are connected to the plural switch ports 81A to 81D of the switch device 80 in a star shape. On the basis of the IO table 52 arranged on the IO host adaptor 50, the CPU 10 of the host 1 also recognizes the switch ports 81B to 81D to be used for transmission. Thus, the CPU 10 of the host 1 can access the IO cards 42 to 47 connected to the IO buses 8A to 8C in the same manner as the IO card 40 connected to the IO bus 3.

Embodiment 3

Figures 11, 12:
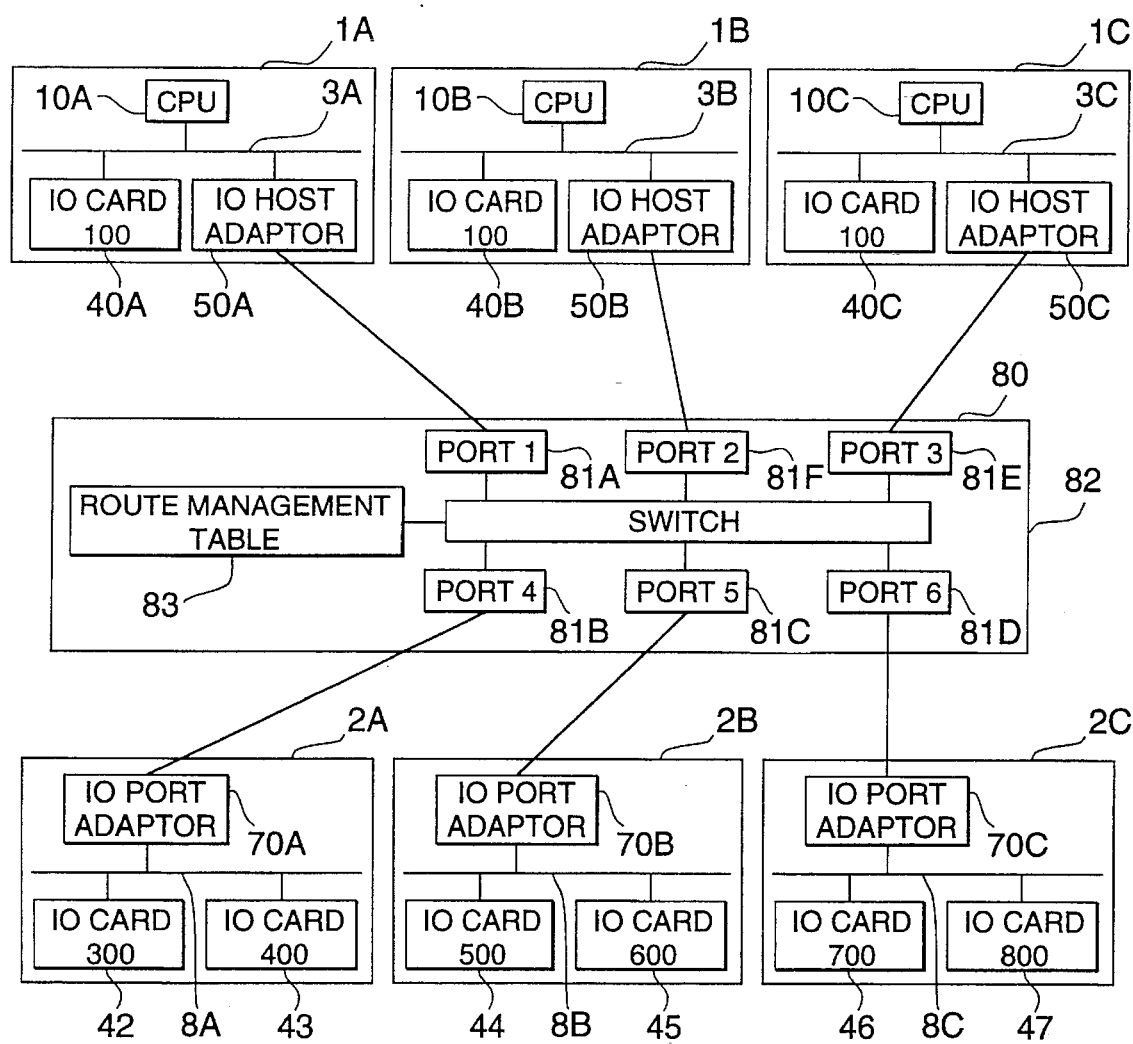
FIG. 11 is a block diagram showing the configuration of a third embodiment of the computer system according to the present invention.
FIG. 12 is a view for explaining the route management table in a switch device of FIG. 11.

The third embodiment of the multi-computer system according to the present invention is shown in FIG. 11 in which the same reference numerals refer to the same elements in FIG. 8. As seen from FIG. 11, three hosts 1A to 1C are connected to three shared IO devices 2A to 2C through the switch device 80. The operation of processing a transaction from each of the hosts 1A to 1C is carried out in the same manner as in the second embodiment as described above. Namely, each of the plural hosts 1A to 1C can access the plural shared IO devices 2A to 2C. In order to avoid access competition for the same switch port of switch ports 81A to 81F, a route management table 83 is provided in the switch device 80. The route management table 83 holds the IO addresses as shown in FIG. 12 which can be read by or written from the CPUs 10A to 10C of the hosts 1A to 1C.

In this embodiment, before normal IO access, the hosts 1A to 1C inquire of the route management table 83 about whether or not they can occupy the connections to the switch ports 81B to 81D to which the shared IO devices 2A to 2C to be accessed are connected. Now, it is assumed that the host 1A desires the connection to the second switch port 81B having a port number "2" in the status of the route management table 83 as shown in FIG. 12. In this case, since the switch port is now in a "free state" in the route management table 83, the host 1 can occupy the second switch port, thereby shifting its "free" state to its "set" state. Upon completion of transaction processing for the above second switch port 81B, the host 1A returns the pertinent information of the route management table 83 from the "set" state to the "free" state.

In order that the IO accessing manner is the same for both of the IO bus 3 in the host 1 and the IO bus 8 of the shared IO device 2, the read/write for the route management table 83 is issued also when the IO card 40 connected to the IO bus 3 in the host 1 is accessed. However, since this operation is directed to the IO address which is not registered on the IO table 52, it is received and disposed in the IO host adaptor 50.

Figure 13:
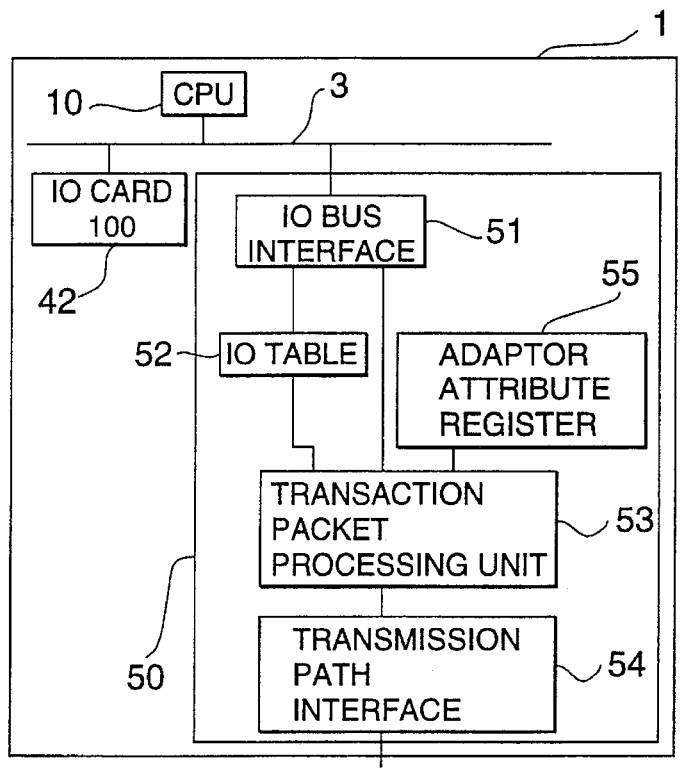
FIG. 13 is a block diagram of the host in which an adaptor attribute register is provided in the IO host adaptor in FIG. 11.

In this embodiment also, the host 1 previously generates the IO table 52 in the IO host adaptor as described above in connection with FIG. 9. As shown in FIG. 13, this is realized by providing an adaptor attribute register 55 in the IO host adaptor 50 and IO port adaptor 70 (not shown). The adaptor attribute register 55 can be read by the IO host adaptor 50 when the host adaptor 50 performs an initialization or resetting operation. In this embodiment, the adaptor attribute register 55 sets "1" for the IO host adaptor 50 and "0" for the IO port adaptor 70.

When the IO host adaptor 50 performs an initialization or resetting operation, it reads the adaptor attribute registers 55 in all devices connected to the switch ports 81A to 81E of the switch device 80 to recognize that the shared IO device 2 is connected to which switch ports 81A to 81F, and writes the IO address information in the IO table 52 on the basis of the recognition. Thereafter, in the flow of the initialization from the CPU 10, the IO cards are configured for the shared IO device 2 to generate the address information in the IO table 52.

Figure 14:
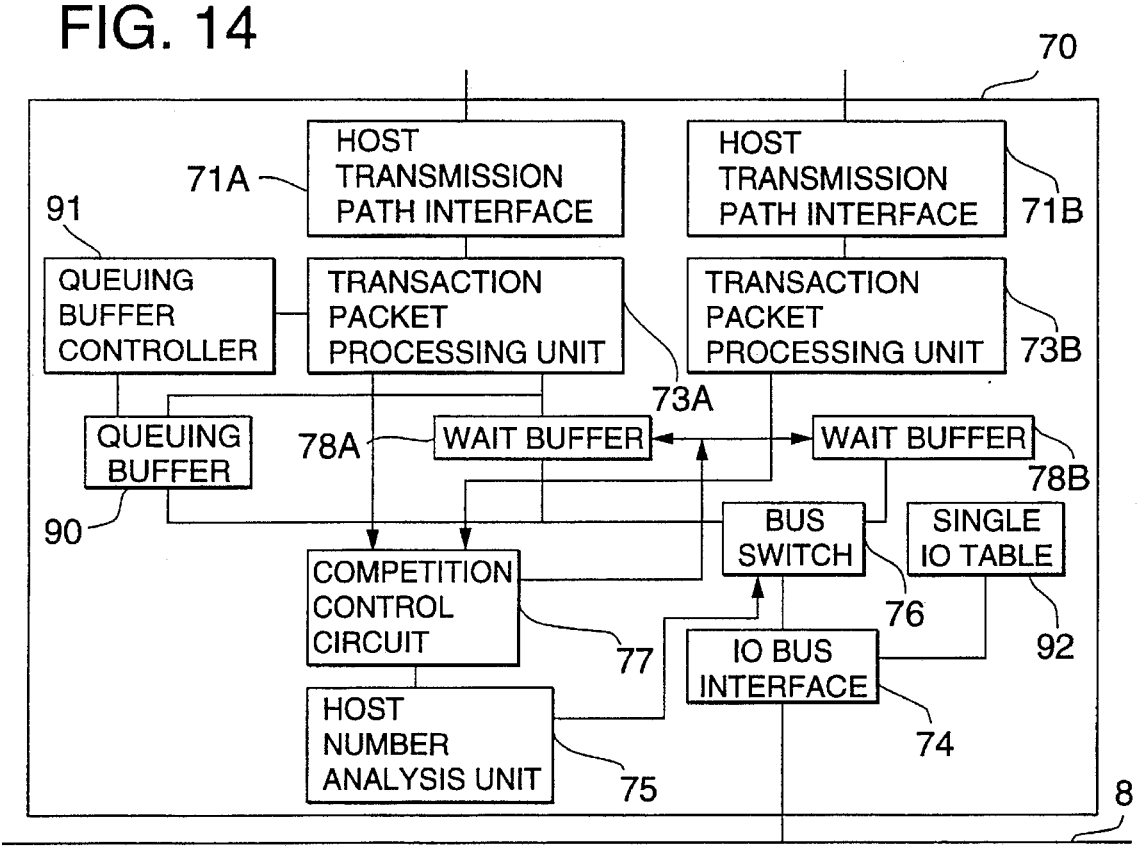
FIG. 14 is a block diagram of the port adaptor of FIG. 11 in which a queuing buffer is provided.

FIG. 14 shows an IO port adaptor 70 which can receive the transactions from plural hosts 1 until the maximum throughput of the connection transmission path between the switch device 80 and the shared IO devices 2, the port connection route being not occupied completely by a single host 1 via the switch device 80. Specifically, if the transaction packets are successively transmitted from the plural hosts 1A to 1C, the IO port adaptor 70 stores these transaction packets in a queuing buffer 90. The transactions stored in the queuing buffer 90 are sequentially processed one by one, and issued toward the IO bus 8.

Since the queuing buffer 90 has a limited capacity, when it becomes full, the transaction packets are received and disposed. In order to solve this problem, before the queuing buffer 90 becomes full, a queuing buffer controller 91 transmits a busy response packet toward each of the IO host adaptors as in the first embodiment. Accordingly, this can prevent the transactions from being issued toward the pertinent shared IO device. The filling degree in the capacity of the queuing buffer 90 when the busy response is issued depends on the buffer capacity and other parameters.

In this embodiment, the IO address information shared by the plural hosts 1A to 1C may depend on the structure of each of the hosts 1A to 1C. In this embodiment, in order that the IO address information connected to each of the shared IO devices 2A to 2C is the same irrespectively of the arrangement of each of the hosts 1A to 1C, the IO mapping information for each of the hosts is stored on the IO table 52. As seen from FIGS. 15A and 15B, the shared IO devices 2 previously determine the unique IO address on the internal IO bus 8 in initialization.

In this embodiment, for example, the IO cards 42 and 43 of the first shared IO device 2A are set for values of "100" and "200", respectively, as the addresses on a single IO table 92 as shown in FIG. 14. Likewise, the IO cards 44 and 45 of the second shared IO device 2B are set for values of "100" and "200" of the single IO table 92 as the addresses.

During the configuration of the IO card in each of the hosts 1A to 1C, each of the IO host adaptors 50A to 50C reads the information on the single IO table 92 in each of the shared IO devices 2A to 2C, and maps it with the IO address information from the CPU 10A to 10C to generate the IO mapping table as shown in FIGS. 15A and 15B. Accordingly, when the CPU 10A of the host 1A issues a transaction for the IO card 43 having an IO address of "400", the IO host adaptor 50A, referring to the IO table 52, issues a transaction packet with the IO address of "100".

In this embodiment, when the IO card side as a master desires to issue a transaction for a specific host 1, as shown in FIGS. 16A–16C, the IO address map on the host memory used in each of the hosts 1A to 1C has an IO address area allotted so as to be different in all the hosts 1A to 1C connected to the system at issue. In this way, the address space of each of the hosts 1A to 1C is uniquely determined from the side of the shared IO devices so that the transaction for the specific host 1 can be issued. For example, when the side of the shared IO device 2 desires to issue a transaction to the second host 1B, it designates the storage area previously allotted in the addresses of (200)H to (2FF)H assured as an IO address area of the host 1B to issue the transaction.

In such an arrangement, as similar to the second embodiment, the CPUs 10A to 10C of the plural hosts 1A to 1C can access the IO cards 42 to 47 connected to the IO buses 8A to 8C in the plural shared IO devices 2A to 2C in the same manner as the IO cards 40A to 40C connected to the IO buses 3A to 3C in the hosts 1A to 1C. Further, the host adaptor 50 decides to which of the IO host adaptor 50 and the IO port adaptor 70 each of the switch ports 81 of the switch device 80 is connected and performs the initial configuration of the IO card connected to the IO bus 8 of the shared IO device 2, thereby easily creating the IO mapping table.

In the IO port adaptor 70, when the CPUs 10 of plural hosts 1 simultaneously issue transactions for the same shared IO device 2, the transactions are stored in the queuing buffer 90 in the order of arrival and issued for the IO bus 8 in the order of arrival. In this way, even when the plural hosts simultaneously access the same shared IO device 2, competition control for respective hosts 1 can be surely performed independently from each other.

In the IO port adaptor 70, a busy response is made predicting the possibility of the queuing buffer 90 becoming full so that the issuing of transactions for the shared IO device for all the hosts 1 is suppressed. In this way, even when the plural hosts simultaneously access the same shared IO device 2, competition control for respective hosts 1 can be surely performed independently from each other.

In the IO host adaptor 50, the IO addresses of the IO cards 42 to 47 viewed from the hosts 1 and those on the side of the actual shared IO device 2 are mapped so that the initializing information of the IO cards connected to each of the shared IO devices 2 is the same irrespectively of the structure of each of the hosts 1. In this way, the case where plural hosts 1 have different IO device mappings for the IO cards 42 to 47 in the shared IO devices can be dealt with.

When the plural hosts 1 are initialized after being connected to the switch device 80, the IO address maps on the memory used by each of the hosts 1 are allotted to different areas so that the hosts 1 are mapped at different addresses, thereby discriminating the plural hosts 1 from the shared IO device 2. In this way, the case where plural hosts 1 have different IO device mappings for the IO cards 42 to 47 in the shared IO devices can be dealt with, and the positions and number of connections between the hosts 1 and the shared IO devices 2 can be changed freely.

As described above, in accordance with the present invention, CPUs in plural host computers select IO devices connected to the host IO buses and an IO device connected to the shared IO bus by IO addressing to issue a transaction; the IO host adaptor in each of the host computers transmits the transaction with a host number when the transaction is issued for the IO device connected to the shared IO bus; and the IO port adaptor in the shared IO device holds the host number of the transaction issued to the IO device connected to the shared IO bus to decide to which of the host computers a response to said transaction should be returned. In this way, a multi-computer system can be realized in which the CPUs in the plural host computers can access the IO devices connected to the shared IO bus in the same manner as the IO devices connected to the internal host IO bus.

In accordance with another aspect of the present invention, when the CPUs in the plural host computers simultaneously issue transactions for the IO device in the shared IO device, the IO port adaptor selectively processes a predetermined transaction in a predetermined host computer, and stores the other transaction of the other host computer while the predetermined transaction is processed, and selectively processes the other transaction upon completion of the predetermined transaction. While the predetermined transaction is processed, the other host computer holds the host IO bus at the waiting state in the normal transaction for the IO device. In this way, a multi-computer system can be realized in which even when the plural hosts simultaneously access the same shared IO device, competition control for respective hosts can be surely performed independently from each other.

In accordance with still another aspect of the present invention, when the CPUs in the plural host computers simultaneously issue transactions for the IO device in the shared IO device, the IO port adaptor selectively processes a predetermined transaction from a predetermined host computer and makes a bus busy response to the other transaction from the other host computer. The IO host adaptor in the other host computer, when it receives the bus busy response, informs the corresponding CPU that the transaction has not been received because of the bus busy. In this way, a multi-computer system can be realized in which even when the plural host computers simultaneously access the same shared IO device, competition control for respective hosts can be surely performed independently from each other.

In yet another aspect of the present invention, the IO host adaptor in a single or plural host computers and the IO port adaptors of the plural shared IO devices are connected, in a star shape, to plural switch ports of the switch device, and the CPU in the host computer(s) recognizes the switch port for transmission on the basis of the mapping table arranged on the IO host adaptor. In this way, a multi-computer system can be realized in which the CPUs in the single or plural host computers can access the IO devices connected to the plural shared IO buses in the same manner as the IO device connected to the host IO bus.

In a further aspect of the present invention, a certain IO host adaptor decides which of the IO host adaptor in the other host computer and the port adaptor of the shared IO device is connected to each of the switch ports of the switch device, and easily creates the mapping table in accordance with the initializing information of the IO device connected to the shared IO bus of the shared IO device. In this way, a multi-computer system can be realized in which the CPUs in the single or plural host computers can access the IO devices connected to the single or plural shared IO buses in the same manner as the IO device connected to the host IO bus.

In a further aspect of the present invention, when the CPUs in the plural host computers simultaneously issue transactions for the same shared IO device, the IO port adaptor, using the queuing buffer, issues sequentially the transaction from each of the host computers in the order of arrival for the shared IO bus in the shared IO device. In this way, a multi-computer system can be realized in which even when the plural hosts simultaneously access the same shared IO device, competition control for respective hosts can be performed independently from each other.

In a further aspect of the present invention, the IO port adaptor predicts the possibility of the queuing buffer becoming full so that the issuing of transactions for the shared IO device for all the host computers is suppressed. In this way, a multi-computer system can be realized in which even when the plural host computers simultaneously access the same shared IO device, competition control for respective host computers can be performed independently from each other.

In a further aspect of the present invention, the IO host adaptor maps the IO address of the IO card viewed from each of the host computers and that on the side of the actual shared IO device so that the initializing information of the IO cards connected to each of the shared IO devices is the same irrespective of the structure of each of the host computers. In this way, a multi-computer system can be provided which can deal with the case where plural host computers have different IO device mappings for the IO cards in the shared IO devices.

In a further aspect of the present invention, when the plural host computers are initialized after being connected to the switch device, the IO address maps on the memory used by each of the host computers are allotted to different areas so that the host computers are mapped at different addresses viewed from the side of the shared IO device, thereby discriminating the plural host computers from the shared IO device. In this way, a multi-computer system can be realized which can deal with the case where plural host computers have different IO device mappings for the IO cards in the shared IO devices and freely changes the positions and number of connections between the host computers and the shared IO devices.

What is claimed is:

1. A multi-computer system comprising:

a shared IO device having a shared IO bus, an IO port adaptor connected to said shared IO bus, and shared IO cards connected to said shared IO bus; and a plurality of host computers, each having a unique host number and each including a host IO bus, an IO host adaptor connected to said host IO bus and said IO port adaptor, a host IO device connected to said host IO bus, and a CPU connected to said host IO bus, for selecting said host IO devices and a shared IO device by IO addressing and issuing a transaction packet to said host IO device and said shared IO device;

each IO host adaptor having transmitting means for transmitting said transaction packet with the host number associated with the respective host computer when said transaction packet is issued to said shared IO device;

said IO port adaptor having analyzing means for analyzing the host number of said transaction packet issued to said shared IO device and selecting means for selecting one transaction packet issued by a respective CPU of the plurality of CPUs in said plurality of host computers so that said IO port adaptor executes said selected transaction packet, when at least one of said other CPUs simultaneously issues other transaction packets for said shared IO devices, and deciding memos for deciding to return said transaction packet to the host computer associated with the host number of the transaction;

wherein the selecting means comprises a host number analysis unit and a bus switch connected to the host number analysis unit and the shared IO bus;

wherein the host number analysis unit determines the host number in the selected transaction packet and sets the bus switch so as to connect the shared IO bus with the IO host adapter of the host computer associated with the determined host number.

2. A multi-computer system according to claim 1, wherein said IO port adaptor is further comprising:

storing means for storing the other transaction packets issued by the other CPUs during the execution of said selected transaction packet;

wherein, after execution of said selected transaction packet, said selecting means selects one of the other transaction packets stored in said storing means as a next transaction packet so that said IO port adaptor executes said next transaction packet thus selected; and wherein, while the selected transaction packet is performed, said other host computer holds said host IO bus at the waiting state.

3. A multi-computer system according to claim 1, wherein said IO port adaptor is further comprising:

response means for transmitting a bus busy response to the other host computers having CPUs issuing non-selected transaction packets;

wherein each of said IO host adaptor in each of the other host computers informs said CPU that the transaction packet is not received because of the bus busy response.

4. A multi-computer system comprising:

a plurality of host computers, each including a host IO bus, a host IO device connected to said host IO bus, a CPU connected to said host IO bus and an IO host adaptor connected to said host IO bus;

a plurality of shared IO devices, each including a shared IO bus, a shared IO card connected to said shared IO bus and an IO port adaptor connected to said shared IO bus; and a switch device including a plurality of host switch ports connected to said plurality of IO host adaptors, respectively, and a plurality of shared switch ports connected to respective IO port adaptors, said switch device including connecting means for selectively connecting one of said plurality of host switch ports with one of said plurality of shared switch ports;

each IO host adaptor having an IO-mapping table for distinguishing a correspondence between said shared switch ports of said switch device and all the shared IO devices connected to said shared switch ports and also between said shared switch ports and IO addresses of said shared IO cards in each of the shared IO devices;

wherein each said IO host adaptor recognizes the shared switch port for transmission of a transaction packet issued by the corresponding CPU on the basis of said IO mapping table; and wherein said connecting means selectively connects one of said plurality of host switch ports with one of said plurality of shared switch ports based on information within said transaction packet.

5. A multi-computer system according to claim 4, wherein each said IO host adaptor decides as to whether, at a time of initialization, each of said switch ports of said switch device is connected to an IO host adaptor in another host computer or said port adaptor of each of said shared IO devices; and each said IO host adaptor generates said IO mapping table in accordance with the initializing information of said shared IO card connected to said shared IO bus of said shared IO device.

6. A multi-computer system according to claim 4, wherein each said IO port adaptor includes a queuing buffer for storing a transaction packet from a corresponding CPU in an order of arrival when at least two of said CPUs in said plurality of host computers simultaneously issue transaction packets respectively for the same shared IO device, each said IO port adaptor issuing sequentially the transaction packet from each of said at least two host computers in an order of arrival for said shared IO bus in said shared IO device.

7. A multi-computer system according to claim 6, wherein each said IO port adaptor predicts a possibility of said queuing buffer becoming full to suppress the issuing of transaction packets for said shared IO device for all the host computers.

8. A multi-computer system according to claim 4, wherein each said IO host adaptor maps an IO address of said shared IO device seen from each of said host computers and the IO address on a side of an actual shared IO device so that initializing information of the IO device connected to each of the shared IO devices is the same irrespective of a structure of each of the host computers.

9. A multi-computer system according to claim 4, wherein when said host computers are initialized after being connected to said switch device, IO address maps in a memory used by each of the host computers are allotted to different areas so that the host computers are mapped at different addresses seen from a side of shared IO device to discriminate said plurality of host computers from the shared IO device.

10. A multi-computer system according to claim 1 wherein the IO host adaptor further comprises:

an IO table containing a unique address associated with each shared IO card connected to the shared IO bus.

11. A multi-computer system according to claim 2 wherein the IO host adaptor further comprises:

an IO table containing a unique address associated with each shared IO card connected to the shared IO bus.

12. A multi-computer system according to claim 3 wherein the IO host adaptor further comprises:

an IO table containing a unique address associated with each shared IO card connected to the shared IO bus.

13. A multi-computer system according to claim 2 wherein the selecting means comprises:

a competition control circuit;

a host number analysis circuit connected to the competition control circuit;

a bus switch connected to the host number analysis circuit and the shared IO bus; and the storing means comprising:

a plurality of wait buffers, one per host computer, coupled to the bus switch, the competition control circuit and the IO host adapter;

wherein the competition control circuit selects the transaction packet for execution, causes the unselected transaction packets to be stored in respective wait buffers and passes the selected transaction packet to the host number analysis circuit; and wherein the host number analysis circuit determines the host number in the selected transaction packet and sets the bus switch to so as to connect the shared IO bus with the IO host adapter of the host computer associated with the determined host number.

14. A system comprising:

a host computer, including a host IO bus, an IO host adapter connected to the host IO bus, an IO device connected to the host IO bus and a CPU connected to the host IO bus;

a plurality of shared IO devices, each including a shared IO bus, a shared IO card connected to the shared IO bus and an IO port adaptor connected to the shared IO bus;

a switch device including a host switch port connected to the IO host adaptor and a plurality of shared switch ports connected to the plurality of IO port adaptors, respectively, said switch device including connecting means for selectively connecting the host switch port to one of the plurality of shared switch ports;

the IO adaptor having an IO-mapping table for distinguishing a correspondence between the shared switch ports of the switch device and all the shared IO devices connected to the shared switch ports and also between the shared switch ports and IO addresses of the shared IO cards in each of the shared IO devices;

wherein the IO host adaptor recognizes the shared switch port for transmission of a transaction packet issued by the CPU on the basis of the IO mapping table;

wherein the connecting means selectively connects the host switch port to one of the plurality of shared switch ports based on information within said transaction packet.

* * * * *